(12) United States Patent
Maekawa

(10) Patent No.: US 8,699,844 B2
(45) Date of Patent: Apr. 15, 2014

(54) CONTENT DISTRIBUTION APPARATUS

(75) Inventor: Atsushi Maekawa, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1938 days.

(21) Appl. No.: 11/600,161

(22) Filed: Nov. 16, 2006

(65) Prior Publication Data

US 2007/0157265 A1 Jul. 5, 2007

(30) Foreign Application Priority Data

Dec. 22, 2005 (JP) ................................. 2005-370715

(51) Int. Cl.
*H04N 5/931* (2006.01)
(52) U.S. Cl.
USPC ............................................ 386/207; 375/88
(58) Field of Classification Search
None
See application file for complete search history.

(56) References Cited

U.S. PATENT DOCUMENTS

| 2002/0013166 A1* | 1/2002 | Yoshitomi ........................ 463/7 |
| 2002/0083459 A1* | 6/2002 | Kondo et al. .................... 725/88 |
| 2003/0182437 A1* | 9/2003 | Kobayashi et al. ........... 709/232 |
| 2004/0109667 A1 | 6/2004 | Matsuda et al. |
| 2005/0232588 A1 | 10/2005 | Hosoda et al. |

FOREIGN PATENT DOCUMENTS

| JP | A 2000-235648 | 8/2000 |
| JP | A-2002-044542 | 2/2002 |
| JP | A-2004-0020787 | 3/2004 |
| JP | A-2005-110016 | 4/2005 |
| JP | A-2005-203895 | 7/2005 |
| JP | A-2005-277531 | 10/2005 |

OTHER PUBLICATIONS

Japanese Office Action issued in Japanese Patent Application No. 2005-370715 dated Oct. 18, 2011 (with translation).
Japanese Office Action dated Jan. 25, 2011 issued in Japanese Patent Application No. 2005-370715 (with translation).
Oct. 29, 2009 Office Action issued in Korean Patent Application No. 10-2006-0125630 (with translation).

* cited by examiner

*Primary Examiner* — Thai Tran
*Assistant Examiner* — Jose Mesa
(74) *Attorney, Agent, or Firm* — Oliff PLC

(57) ABSTRACT

A content distribution apparatus includes a receiving section, a correction section, an evaluation section and a summary generation section. The receiving section receives plural pieces of watching information of target content information and stores the received watching information. Each of the watching information includes information indicating a reproduction start position from which it was started to reproduce the target content information. The correction section corrects each of the reproduction start positions to any of a plurality of predetermined positions. The evaluation section generates evaluation information of each corrected reproduction start position based on the corrected reproduction start position and the stored watching information. The summary generation section extracts a part of the target content information based on the generated evaluation information of the respective corrected reproduction start positions to generate summary information of the target content information.

6 Claims, 6 Drawing Sheets

| DATE AND TIME | USER | CONTENT INFORMATION | REPRODUCTION START POSITION | REPRODUCTION TIME INFORMATION |
|---|---|---|---|---|
| aaaa | bbbb | cccc | dddd | eeee |
| ⋮ | ⋮ | ⋮ | ⋮ | ⋮ |
| | | | | |

*FIG. 6*

SUMMARIZE BASED ON CONTENT WATCHING SITUATION OF OTHER USERS

VIDEO TO BE SUMMARIZED
VIDEO ID: [         ]   } A

VIDEO REPRODUCTION START POSITION / FAVORITE ADDITION POSITION   } B
☐ CARTOON   ☐ SLIDER   ☐ SLIDE
☐ MUSIC SEARCH   ☐ INDEX   ☐ FAVORITE

ACCESS PERIOD   } C
○ LAST THREE MONTHS   ○ LAST SIX MONTHS   ○ LAST ONE YEAR   ○ ALL PERIOD

TARGET USER
○ SPECIFIC USER   USER ID: [         ]
○ SPECIFIC GROUP   GROUP ID: [         ]
○ ALL USERS
} D

IN ADDITION,
SUMMARIZE CONTAINING THE FOLLOWING TARGET OF YOUR INTEREST
☐ THE FOLLOWING VOICE IS CONTAINED   KEYWORD: [         ]
☐ SCENE SIMILAR TO THE FOLLOWING IMAGE FILE IS CONTAINED
FILE: [         ]   [REFERENCE]
} E

[REPRODUCE SUMMARY VIDEO UNDER ABOVE CONDITIONS]

CONTENT DISTRIBUTION APPARATUS

BACKGROUND

1. Technical Field

This invention relates to a content distribution apparatus for distributing content information containing moving image data.

2. Description of the Related Art

In recent years, an electronic learning system for transmitting lecture through communication means such as a computer network has been becoming pervasive. Contents of the lecture, which is distributed on the electronic learning system, generally contain moving image data containing a motion of a lecturer, still image data containing descriptions written on a blackboard and a slide image, voice data such as voice of a lecturer, and other various elements (content elements).

A lecture receiving part displays the moving image data according to a predetermined layout by a browsing software and views the displayed moving image data.

SUMMARY

According to an aspect of the invention, a content distribution apparatus includes a receiving section, a correction section, an evaluation section and a summary generation section. The receiving section receives plural pieces of watching information of target content information and stores the received watching information. Each of the watching information includes information indicating a reproduction start position from which it was started to reproduce the target content information. The correction section corrects each of the reproduction start positions to any of a plurality of predetermined positions. The evaluation section generates evaluation information of each corrected reproduction start position based on the corrected reproduction start position and the stored watching information. The summary generation section extracts a part of the target content information based on the generated evaluation information of the respective corrected reproduction start positions to generate summary information of the target content information.

BRIEF DESCRIPTION OF THE DRAWINGS

Exemplary embodiments of the invention will be described below with reference to accompanying drawings wherein:

FIG. 6 is a schematic representation to show an example of an interface used to set parameters, which are used in generating summary information and are provided to the content distribution apparatus according to the exemplary embodiment of the invention.

DETAILED DESCRIPTION

Figure 1:
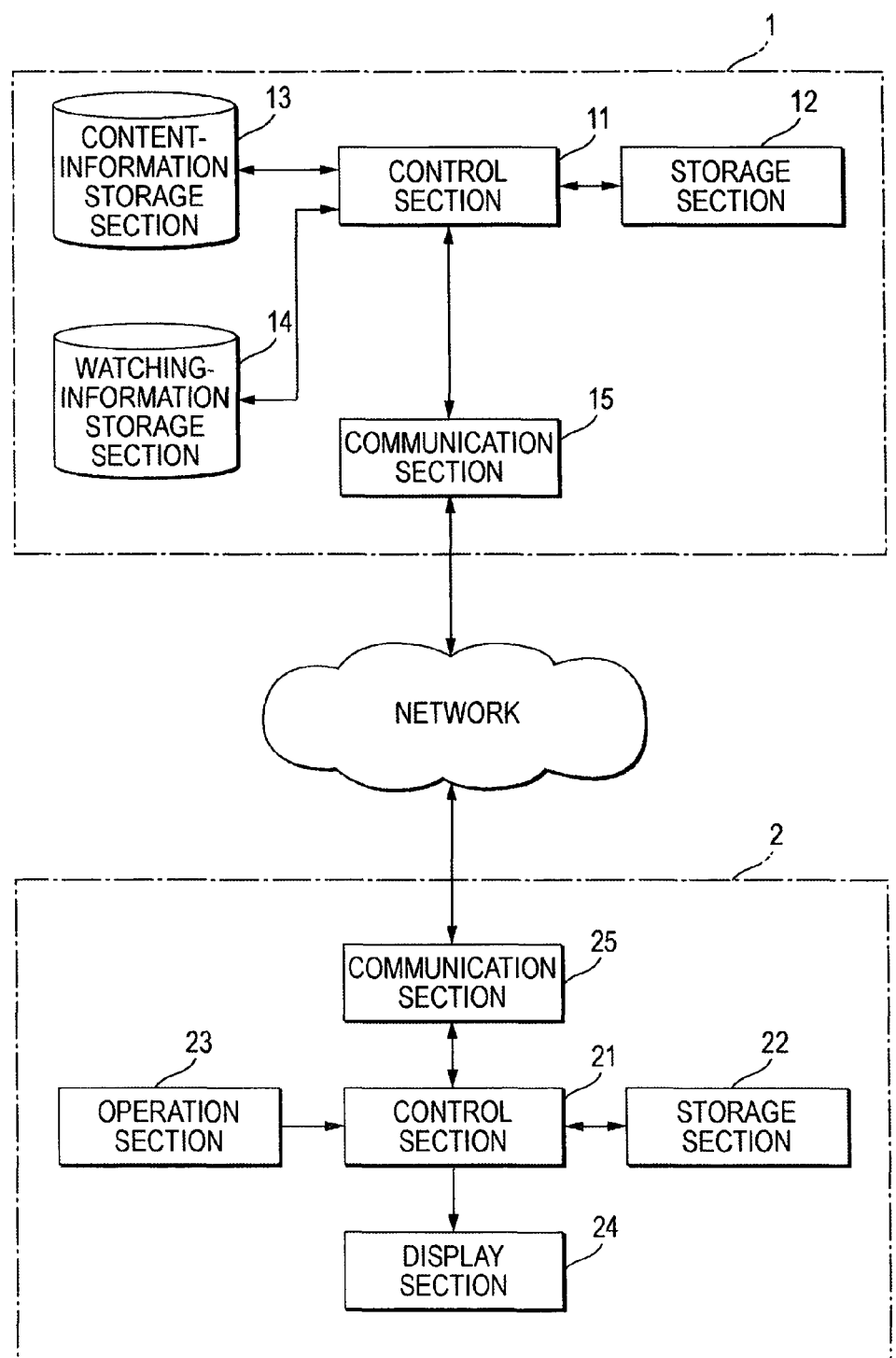
FIG. 1 is a block diagram to show a configuration example of a system, which includes a distribution server serving as a content distribution apparatus according to an exemplary embodiment of the invention.
Figure 2:
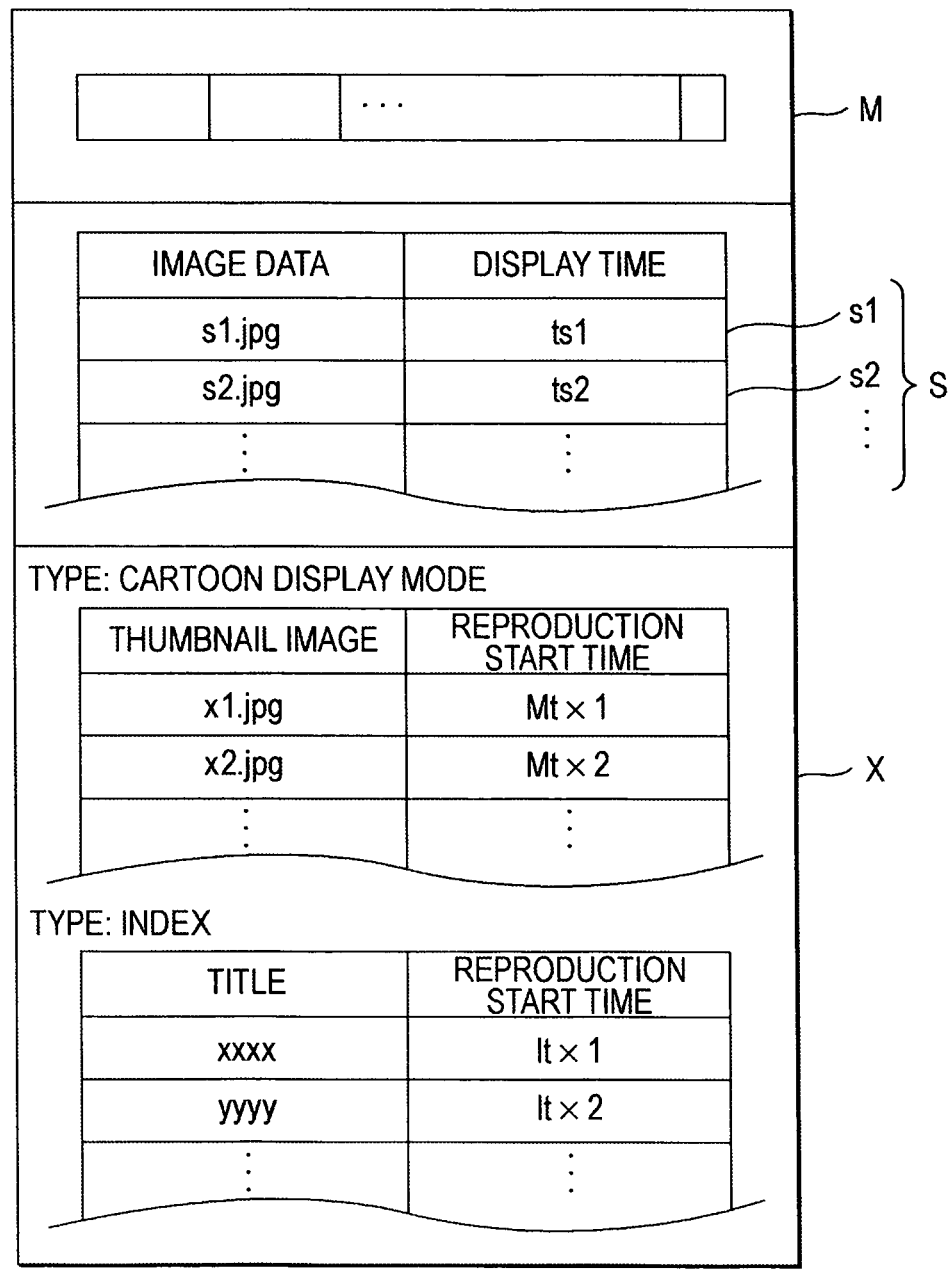
FIG. 2 is a schematic representation to show an example of content information and index information, which are distributed by the content distribution apparatus according to the exemplary embodiment of the invention.

Referring now to the accompanying drawings, exemplary embodiments of the invention will be described below. A content distribution apparatus according to an exemplary embodiment of the invention is implemented as a distribution server 1, which distributes content information to a user's client 2 and causes the user's client 2 to reproduce the content information, as shown in FIG. 1. That is, a system including the content distribution apparatus of the exemplary embodiment includes the distribution server 1 serving as the content distribution apparatus and a watching device 2 serving as a client. The distribution server 1 and the watching device 2 are connected through a network. Only one watching device 2 is shown in FIG. 1. However, plural watching devices 2 may be provided in the system. In this case, the distribution server 1 distributes content information to the respective watching devices 2.

The distribution server 1 includes a control section 11, a storage section 12, a content-information storage section 13, a watching-information storage section 14 and a communication section 15 as shown in FIG. 1. The watching device 2 includes a control section 21, a storage section 22, an operation section 23, a display section 24 and a communication section 25.

The control section 11 of the distribution server 1 may be a CPU and operates in accordance with a program stored in the storage section 12. The control section 11 executes a process of distributing content information stored in the content-information storage section 13. The control section 11 also executes a process of receiving watching information concerning a watching state from the watching device 2 and storing the received watching information in the watching-information storage section 14. Further, in this exemplary embodiment, the control section 11 performs a process of generating summary content, which is a summary of the content information. The processes performed by the control section 11 will be described later in detail.

The storage section 12 may include a memory device such as RAM and ROM. The storage section 12 stores programs to be executed by the control section 11. The storage section 12 also operates as work memory of the control section 11.

The content-information storage section 13 may be a storage device such as a hard disk. The content-information storage section 13 stores at least one piece of the content information to be distributed.

It is assumed that the content information contains at least one piece of moving image data (M), slide images S and index information X and that the slide images S are a group of still images showing a blackboard and are displayed in synchronization with reproduction time of the moving image data with being switched at predetermined timings.

The index information includes (i) information, which specifies any of predetermined index types, and (ii) information, which indicates separation positions on the reproduction time of the moving image data. The index types may include "cartoon display mode" in which a list of thumbnail images are displayed like a panel cartoon, "slider display mode" in which the separation positions are displayed like a bar code on the time axis, "index" preset by a person who registers the content information, "favorite" in which a position of the moving image data set by a viewer is displayed the position.

In this exemplary embodiment, respective still image data s1, s2 . . . , which are included in the slide images S, are associated with time information ts1, ts2, . . . at which the respective still images s1, s2, . . . should be displayed. Also, in the index information X, with regard to the cartoon display mode, data specifying thumbnail images are associated with reproduction start time Mtx1, Mtx2, . . . corresponding to the respective thumbnail images. Also, with regard to the index mode, character string information of titles are associated with reproduction time Itx1, Itx2, . . . .

The watching-information storage section 14 may be a storage device such as a hard disk. The watching-information storage section 14 stores the watching information received from the watching device 2 in association with information, which specifies a user of the watching device 2.

The communication section 15 may be a network interface. The communication section 15 transmits moving image data in accordance with a command input from the control section 11. The communication section 15 outputs the watching information received from the watching device 2 through the network, to the control section 11.

The control section 21 of the watching device 2 may be a CPU. The control section 21 operates in accordance with a program stored in the storage section 22. The control section 21 stores the content information received from the distribution server 1 in the storage section 22. Also, the control section 21 decodes the content information stored in the storage section 22 in accordance with user's command entry operation, and displays the moving image data and the still image data of slide image contained in the content information on the display section 24 in synchronization with each other. The control section 21 displays the index information contained in the content information. When a user selects any character string data from the index information, the control section 21 reproduces the moving image data and the still image data of slide image from the reproduction start time associated with the selected character string data.

The storage section 22 may include a memory device such as RAM and ROM. The storage section 22 stores programs to be executed by the control section 21. The storage section 22 also operates as work memory of the control section 21 and stores the content information to be reproduced.

The operation section 23 may be a mouse and a keyboard and outputs contents of user's command entry operation to the control section 21. The display section 24 may be a display and displays an image in accordance with a command input from the control section 21.

The communication section 25 may be a network interface and transmits data such as watching information in accordance with a command input from the control section 21. The communication section 25 outputs the content information received from the distribution server 1 through the network, to the control section 21.

A process of distributing content information performed by the distribution server 1 will be described below. The distribution server 1 of the exemplary embodiment receives information, which specifies the content information to be distributed, from the watching device 2 and performs a distribution process.

The distribution server 1 reads content information, which is specified as a distribution target, from the content-information storage section 13. Also, the distribution server 1 reads index information associated with the read content information. Then, the distribution server 1 generates detailed screen information containing commands for displaying the moving image data according to the respective index types (screen description information described in HTML) and the index information, and outputs the detailed screen information to the watching device 2, which is a request source.

Figure 3:
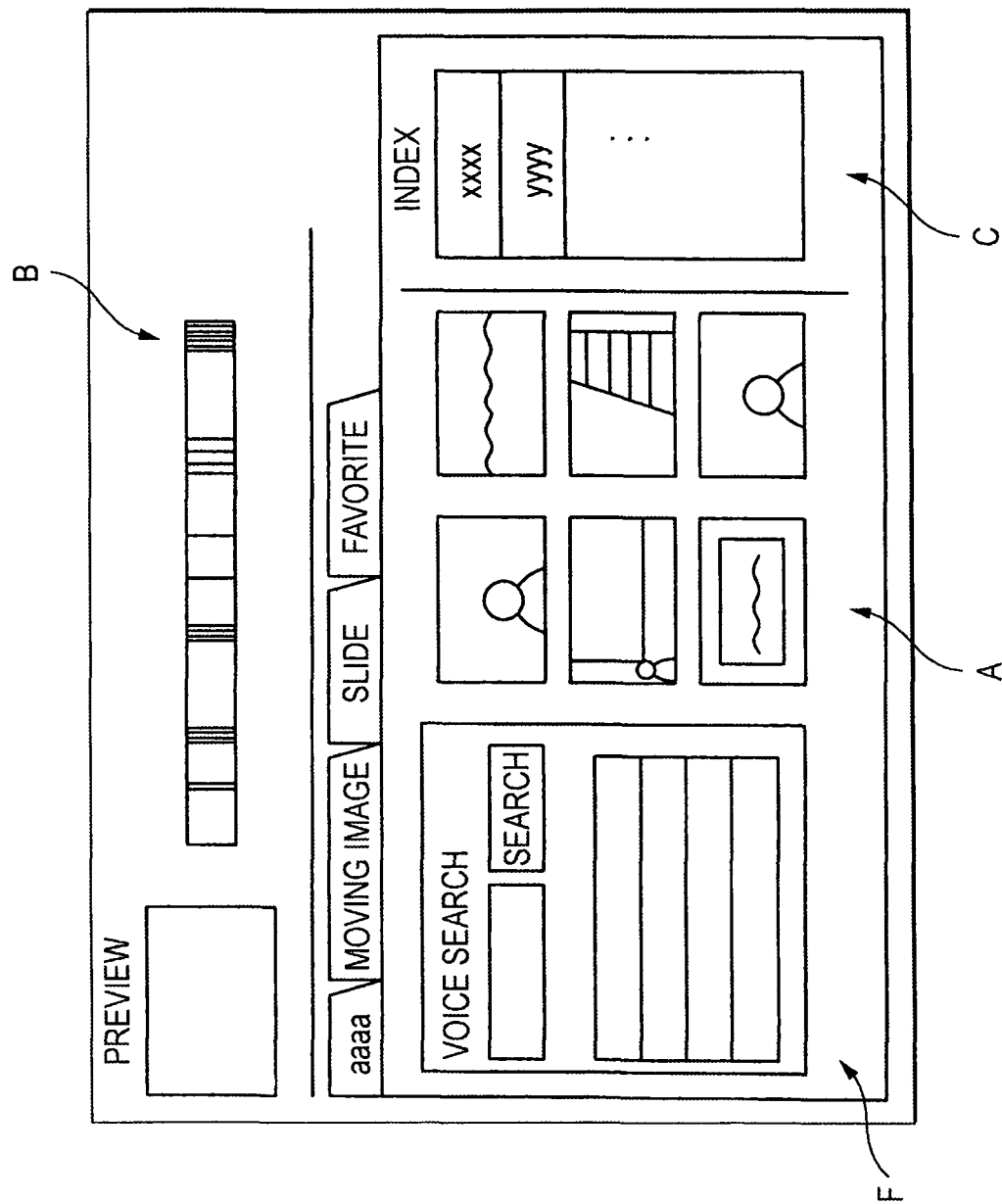
FIG. 3 is a schematic representation to show an example of an interface screen used to set information for the content distribution apparatus according to the exemplary embodiment of the invention.

As shown in FIG. 3, for example, the detailed screen information contains:

(A) description for arranging thumbnail images corresponding to the separation positions indicated by the index information of the "cartoon display mode" in a panel cartoon manner in accordance with the index information of "cartoon display mode;"

(B) description for displaying the separation positions indicated by the index information of the "slider display mode" like a bar code on the time axis, in accordance with the index information of "slider display mode;"

(C) description for displaying "index" preset by a person who registers the content information;

(D) description of displaying a list of "favorites," which are positions set by a viewer; and (E) description for displaying a list of the reproduction start timings corresponding to the slide images. The detailed screen information may further contain (F) description for searching for parts where it is estimated that someone speaks an input keyword as voice search and displaying a list of the parts.

Figures 4, 5:
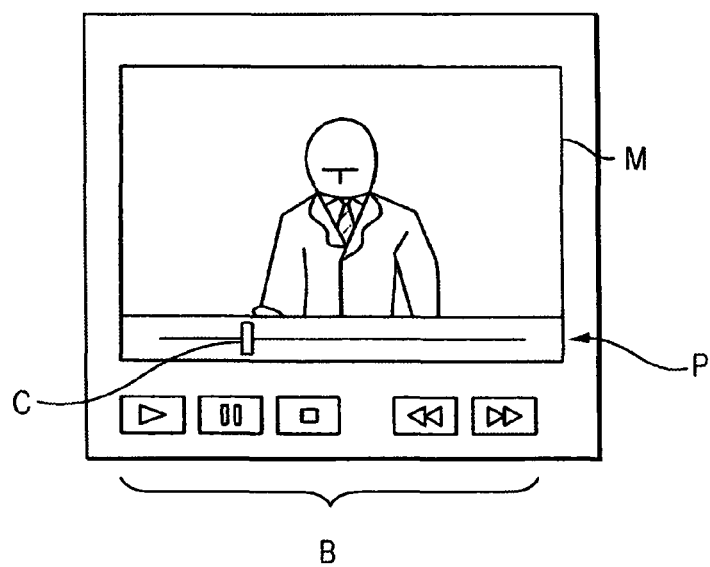
FIG. 4 is a schematic representation to show an example of a display screen of the content information provided by the content distribution apparatus according to the exemplary embodiment of the invention.
FIG. 5 is a schematic representation to show an example of watching information stored in the content distribution apparatus according to the exemplary embodiment of the invention.

The control section 21 of the watching device 2 receives the detailed screen information sent from the distribution server 1 and displays an interface screen (detailed screen) on the display section 24 based on the detailed screen information. The control section 21 also displays an interface screen (control screen) for controlling reproduction of the content information. As shown in FIG. 4, the control screen contains a group of buttons (B) for entering commands of rewinding (backward reproducing), reproducing, fast forwarding and pausing; and a progress bar (P) representing a reproduction position of the moving image data. A cursor (C) is displayed on the progress bar (P) and the display position of the cursor (C) is controlled in response to the reproduction position. An area where moving image data (M) is displayed and an area where still image data of a slide image is displayed may be provided in the control screen.

If a user clicks on the reproducing button in the group of buttons (B), the control section 21 transmits a command to the distribution server 1 for distributing the content information from the beginning.

Upon reception of the command, the distribution server 1 distributes the content information from the beginning in accordance with the received command. The watching device 2 receives the content information and the control section 21 stores the received content information in the storage section 22. The control section 21 sets the reproduction time information to "0," and updates the reproduction time information in accordance with a not-shown clock (which measures time), for example, advances the reproduction time information by $\Delta\tau$ in real time during a period in which the time elapses $\Delta\tau$ seconds.

For example, if the moving image data is in the MPEG format, the control section 21 decodes data of a frame corresponding to reproduction time indicated by the reproduction time information and displays the decoded data in the moving image display area (M) of the display section 24. The control section 21 references information each of which indicates time when the associated still image data of the slide image should be displayed, and displays in the display area still image data whose time at which the still image data should be displayed becomes closest to time indicated by the reproduction time information.

The control section 21 displays the moving image data and the still image data while updating the reproduction time information.

When the user enters a rewinding command, predetermined time ΔTrev is subtracted from the reproduction time information and the moving image data and the still image data at the resultant point in time are displayed. When the user enters a fast forwarding command, predetermined time ΔTff is added to the reproduction time information and the moving image data and the still image data at the resultant point in time are displayed. In this case, reproduction of the moving image data is fastened at speed as fast as times a value determined for the time ΔTff relative to the usual proceeding time.

Further, when the user enters a pause command, advancing the reproduction time information is stopped and updating the current displayed moving image data and still image data is stopped.

While performing the process concerning a reproducing command, a rewinding command or a fast forwarding command, the control section 21 performs a process of moving the cursor of the progress bar to the position corresponding to the reproduction time information. When the user moves the cursor, the control section 21 controls the reproduction position of the moving image data in accordance with move speed and move position of the cursor. That is, the control section 21 acquires cursor position information every predetermined acquisition timing, updates the reproduction time information to time corresponding to the acquired position, and updates and reproduces the moving image data and the still image data. For example, if the user moves the cursor at speed higher than the usual reproduction speed in the forward direction (in a direction from the beginning to the end of the moving image data), the moving image data is reproduced as a similar effect to fast forward. Various types of reproduction control process of the moving image data with the reproduction speed made variable are known and therefore will not be described here in detail.

The method of entering a reproduction start command by the user is not limited to the case where the content information is reproduced from the beginning as described above. For example, if the user enters a command of reproducing the content information starting at the position specified by the index information in such a manner that the user double clicks on either of a thumbnail and a character string displayed as the index information, the control section 21 acquires the separation position information associated with the double-clicked index information, adopts the acquired separation position as the reproduction start position, and starts to reproduce the content information (reproduce the moving image data and slide image) at the reproduction start position.

Further, the user may move the cursor of the progress bar before reproduction of the moving image data starts and may click on the reproducing button to start reproducing the moving image data from the position to which the cursor is moved. In this case, the reproduction time information is set to the time corresponding to the position to which the cursor is moved and then, reproducing the moving image data and the slide image is started.

Further, when receiving the command of reproducing content information, the control section 21 collects information concerning a watching situation of the user. For example, the control section 21 acquires and stores information, which specifies a reproduction start position selected by the user, in the storage section 22. Then, the control section measures time period (reproduction time information) from the time when the reproducing button is clicked on to the time when reproducing of the moving image data is terminated, for example the time when the stop button is clicked on. The control section 21 generates watching information containing: information specifying a user; information specifying the content information being reproduced; information specifying the reproduction start position; and the reproduction time information, and sends the generated watching information to the distribution server 1. The control section 21 may acquire the information specifying the user by previously authenticating the user with using a password.

Next, a process relating to the watching information performed by the control section 11 of the distribution server 1 will be described below. When receiving the watching information from the watching device 2, the distribution server 1 acquires time-and-date information indicating time and date of the reception of the watching information. The distribution server 1 associates the received watching information and the time-and-date information with each other and stores the received watching information and the time-and-date information in the watching-information storage section 14 as watching log (see FIG. 5). The control section 11 may acquire the time-and-date information from a calendar IC (not shown).

Further, the distribution server 1 may be implemented not only as a single computer, but also as a computer system including two or more computers. In this case, a computer for distributing moving image data and a computer for performing a watching management process of receiving watching information may be separate from each other.

Further, upon reception of a command to generate summary information from the user, the control section 11 generates summary information using the information stored in the watching-information storage section 14 (the watching log).

A specific process example will be described below. Upon reception of a command to generate the summary information from the watching device 2, the control section 11 sends a command for displaying an interface screen for entering parameter information used in generating the summary information, to the watching device 2, which transmits the summary information generation command.

Upon reception of the interface screen display command, the watching device 2 presents a screen shown in FIG. 6, for example. The presented information may contain information (A) specifying content to be summarized; information (B) of division time point used as a summary index (e.g., separation position information and favorite setting position); a command (C) for limiting a time period of watching logs to be referenced; and information (D) specifying a target user. The presented information may further contain a screen for entering a command (E) designating whether or not voice corresponding to a specified character string is to be contained in the summary information or whether or not a similar portion to a specified image data is to be contained in the summary information.

When the user enters parameter information relevant to summary information generation through the screen shown in FIG. 6, the watching device 2 transmits the entered parameter information to the distribution server 1. The control section 11 of the distribution server 1 references the parameter information relevant to the summary information generation and generates the summary information by performing the following processing.

Figure 7:
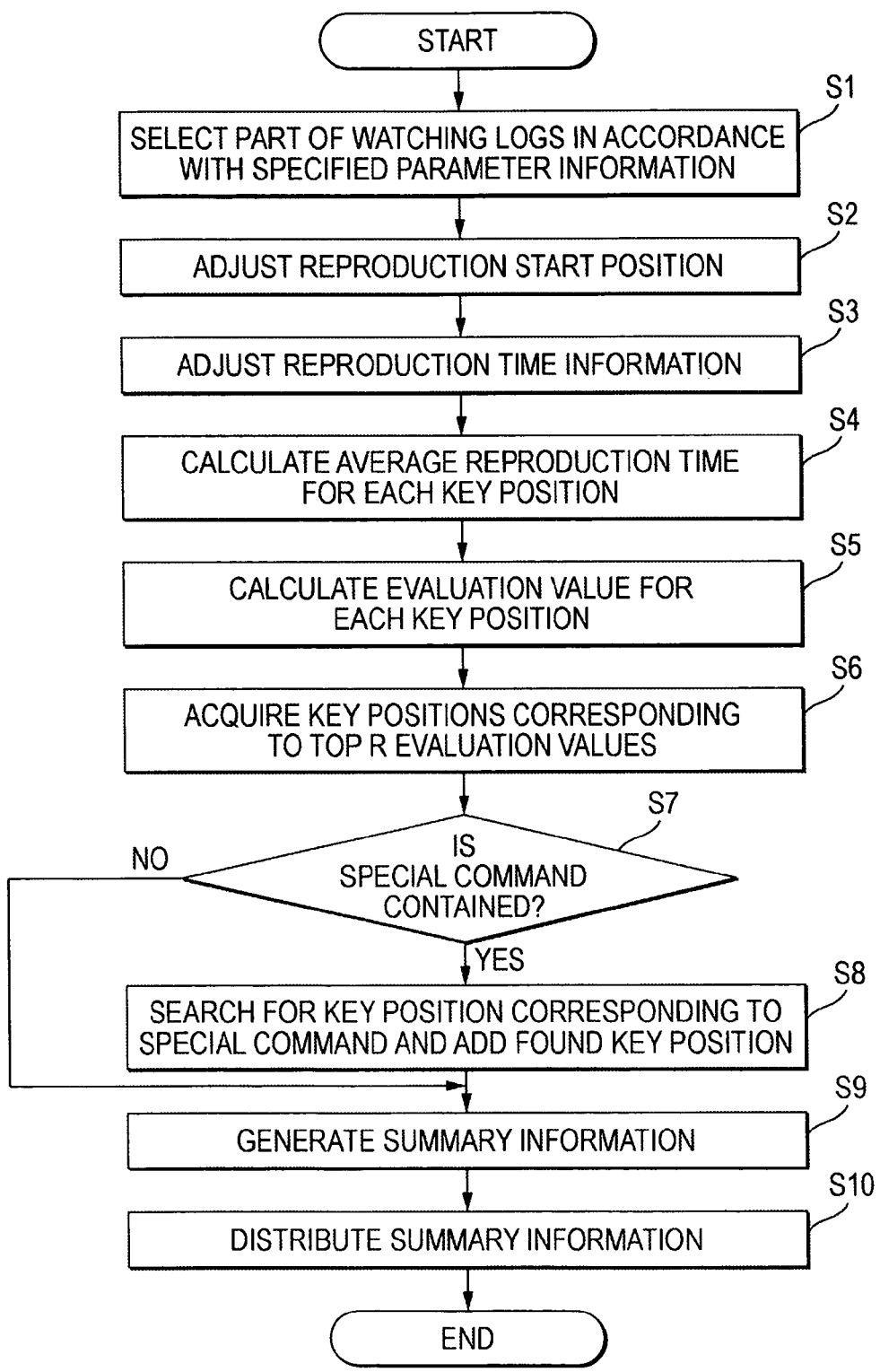
FIG. 7 is a flowchart to show a processing example of generating summary information in the distribution server serving as the content distribution apparatus according to the exemplary embodiment of the invention

As shown in FIG. 7, the control section 11 selectively reads watching logs satisfying conditions stipulated by the command limiting the record time period of the watching logs and the information specifying the target user, from among the watching logs relating to the content information specified as a summarization target (S1).

The control section 11 totalizes the watching logs with using the reproduction start position contained in each of the selectively read watching logs as keys. Before this process, the control section 11 executes an adjustment process of adjusting the reproduction start position (S2). That is, if the user enters a reproduction start command from a position, which is predetermined before content information is distributed (for example, selecting a reproduction start position from positions corresponding to thumbnails displayed in the cartoon display mode or positions corresponding to the slide images, or selecting a reproduction start position based on index), the reproduction start position is only any selected from the predetermined positions (which may be referred to as a "previous setup position"). However, if the user sets the reproduction start position with using the slider or favorite, practically infinite number of start points exist. Thus, when the watching logs are totalized with the reproduction start positions used as keys, the infinite number of reproduction start points may cause inconvenience.

Then, the control section 11 adjusts (corrects) the reproduction start positions. As a specific process example, at step S2, the control section 11 judges whether or not a reproduction start position of each selectively read watching log matches any of the reproduction start positions (previous setup positions), which are predetermined in advance in association with the content information to be summarized. If the control section 11 judges that a reproduction start position of one watching log matches any of the previous setup positions, the control section sets a key position of the one watching log to the reproduction start position of the one watching log.

On the other hand, if the control section 11 judges that the reproduction start position of the one watching log does not match any of the previous setup positions (that is, the reproduction start position is not a position corresponding to the cartoon display mode or the slide or is not based on the index, but is designated from the favorites or by operating the slider), the control section 11 sets the key position of the one watching log to a previous setup position closest to the reproduction start position of the one watching log or to predetermined one of the previous setup positions immediately before the reproduction start position of the one watching log.

The control section 11 calculates adjusted reproduction time TLc of each watching log, which has been subjected to the adjustment process, using the reproduction start position (TS), the reproduction time information (TL) and the key position (TK) by the following expression (S3).

$$TLc = TL + (TS - TK)$$

Next, the control section 11 classifies the selectively read watching logs into the respective key positions. Then, the control section 11 calculates the average reproduction time of the watching logs relating to each key position (S4). For example, the average reproduction time may be arithmetic mean of the adjusted reproduction times TLc of the watching logs relating to the same key position. Since the key position is any of at most N previous setup positions Pn (n=1, 2, ... N), the control section 11 can determine average reproduction time Qn corresponding to each previous setup position Pn.

Further, the control section 11 calculates an evaluation value Vn for each key position (previous setup position Pn) (S5). For example, the control section 11 may calculate the evaluation value Vn by the following expression.

$$Vn = Cn \times Qn$$

where Cn denotes number of the watching logs having the same key position (previous setup positions Pn; that is, number of times a command of reproducing from that key position has been entered).

The control section 11 sorts the key positions (previous setup positions Pn) in the descending order of the evaluation values Vn and selects R key positions from the top (R is a predetermined number). Then, the control section 11 stores information, which specifies the selected R key positions in the storage section 12, as summary generation information while associating the information, which specifies the selected R key positions, with the information, which specifies the content information (S6).

The control section 11 checks whether or not the parameter information received from the watching device 2 contains a command (special command) for including voice corresponding to the specified character string or a similar portion to the specified image data in the summary information (S7). If the parameter information contains such a special command, the control section 11 executes a process of searching for the voice corresponding to the specified character string or searching the moving image data for a frame having an image similar to the specified image data, acquires information of a point in time at which the found frame or voice portion appears, adds information indicating the previous setup position just before the appearance point in time to the summary generation information recorded at step S6, and stores the resultant information in the storage section 12 (S8). These processes will not be described in detail because widely known process such as labeling process using a phoneme, for example, may be used.

Next, the control section 11 generates the summary information while referencing the summary generation information stored in the storage section 12 (S9). If the parameter information does not contain the special command at step S7, the control section 11 goes to step S9. The control section 11 distributes the generated summary information to the watching device 2 (S10).

A specific example of generation of the summary information at step S9 will be described. For example, the control section 11 uses information of each previous setup position contained in the summary generation information to generate the summary information as follows.

The control section 11 sorts the previous setup positions Pn contained in the summary generation information in time sequence (in the order of the reproduction times). Then, the control section 11 selects one from the previous setup positions Pn contained in the summary generation information as a position in question sequentially. The control section 11 regards a portion from the position in question to a previous setup position Pn+1 just after the position in question as a summary element. Then, the control section 11 extracts a portion, which corresponds to the summary element, from the moving image data contained in the content information.

The control section 11 concatenates the summary elements thus extracted correspondingly to the previous setup positions in the extraction order (in this example, in the order of the reproduction times) and stores the concatenated summary elements in the storage section 12 as summary information. The control section 11 distributes this summary information to the watching device 2.

If the time from the position in question to the position Pn+1 is shorter than a predetermined lower limit time, the time from the position in question to the position Pn+i may be extracted as a summary element where i is the minimum integer where the time from the position in question to Pn+i becomes longer than the predetermined lower limit time.

Thus, according to the exemplary embodiment, the evaluation value increases in a portion where the possibility that it will become the reproduction start point is high or the possibility that reproduction will be continued after reproduction is started (it is estimated that the viewing wants to watch) according to the watching situation of other persons, and the portions having the high evaluation values are extracted to generate the summary information. This means that the summary information meeting the needs for preponderantly referencing the portions on which other users place importance can be generated.

In the description made so far, as the evaluation value calculation method, the evaluation value Vn is calculated by $$Vn=Tn\times Qn$$

based on the average reproduction time Qn from the reproduction start position and the number of reproduction times Tn. However, if users often watch certain content information to its end, the evaluation value becomes lower as the reproduction start position is closer to the end of such content information. Then, the control section 11 may perform the above described process with using an evaluation value Vn corrected by dividing the average reproduction time Qn by the time from the reproduction start position to the end time of the content information (remaining time), that is, $$Vn=Tn\times(Qn/(TT-Panel))$$

where TT is the total reproduction time of the content information.

The number Fn of user's favorite setup positions contained between the previous setup position Pn, which relates to the evaluation value Vn to be calculated, and the previous setup position Pn+1 may be added as $$Vn=Tn\times Qn+\alpha\times Fn$$

or $$Vn=Tn\times(Qn/(TT-Pn))+\alpha\times Fn$$

where α is a predetermined weighting factor.

The previous setup position Pn is a position, which si predetermined before the content information is distributed, for example, positions corresponding to thumbnails displayed in the cartoon display mode or slide images, or a position designated based on an index. However, the user may be allowed to select at least one of them and the selected position may be adopted as the previous setup position Pn. For example, only the positions corresponding to the thumbnails displayed in the cartoon display mode may be adopted as the previous setup position Pn. Further, not only positions provided for the user as reproduction start position candidates, but also a predetermined division position may be adopted as the previous setup position Pn.

Further, in the description made so far, the user determination information may be not only information identifying each user, such as the user name, but also common information assigned to two or more users, such as a user group. If user group information is thus contained, users of a specific group are set in the user determination information on the user interface screen shown in FIG. 6, for example, it is made possible to generate summary information based on the evaluation of the users belonging to the specific group.

The group can be an age bracket, gender, assigned organization (developing department, sales department, etc.,), etc., for example.

What is claimed is:

1. A content distribution apparatus comprising:
a storage section that stores reproducible data and data indicating a plurality of separation positions that separate beginning to end of the reproducible data into separated areas, wherein when the storage section receives a command with regard to a reproduction start position from which reproduction of target content information is started and a command to start the reproduction of the target content information, the storage section stores information indicating the reproduction start position related to the command to start the reproduction and watching information of the target content information;
an evaluation section that generates, based on the information indicating the reproduction start position and the watching information, evaluation information that evaluates past reproduction situation for each of the plurality of separation positions; and
a summary generation section that extracts a part of the target content information based on the generated evaluation information of the respective separation positions to generate summary information of the target content information,
wherein the evaluation section sets the reproduction start position to one of the plurality of separation positions and evaluates past reproduction situation for each of the plurality of separation positions, and
wherein the evaluation section automatically sets the reproduction start position to one of the plurality of separation positions which is nearest to the reproduction start position.

2. The apparatus according to claim 1, wherein:
the storage section provides the target content information including the predetermined positions, and
the storage section receives the plural pieces of watching information of the target content information, each of the received watching information that includes any of the predetermined positions as the reproduction start position.

3. A non-transitory computer readable medium storing a program causing a computer to execute a process for distributing a summary information of target content information, the process comprising:
storing reproducible data and data indicating a plurality of separation positions that separate beginning to end of the reproducible data into separated areas, wherein when a command is received with regard to a reproduction start position from which reproduction of target content information is started and a command to start the reproduction of the target content information, storing information indicating the reproduction start position related to the command to start the reproduction and watching information of the target content information;
generating, based on the information indicating the reproduction start position and the watching information, evaluation information that evaluates past reproduction situation for each of the plurality of separation positions; and
extracting a part of the target content information based on the generated evaluation information of the respective separation positions to generate the summary information of the target content information,
wherein generating the evaluation information includes setting the reproduction start position to one of the plurality of separation positions and evaluating past reproduction situation for each of the plurality of separation positions, and wherein generating the evaluation information includes automatically setting the reproduction start position to one of the plurality of separation positions which is nearest to the reproduction start position.

4. The apparatus according to claim 1, wherein the summary generation section generates summary information of at least one of the plurality of separation positions whose evaluation result about past reproduction situation by the evaluation section is higher than a predetermined level.

5. The apparatus according to claim 1, wherein the summary generation section does not generate summary information of at least one of the plurality of separation positions whose evaluation result about past reproduction situation by the evaluation section is lower than a predetermined level.

6. The apparatus according to claim 1, wherein the watching information comprises number of watching and time of watching.

* * * * *